April 2, 1935.                 C. OTTO                    1,996,483
                   COMBINED REGENERATIVE COKE OVEN
                     Filed Aug. 1, 1930           2 Sheets-Sheet 1
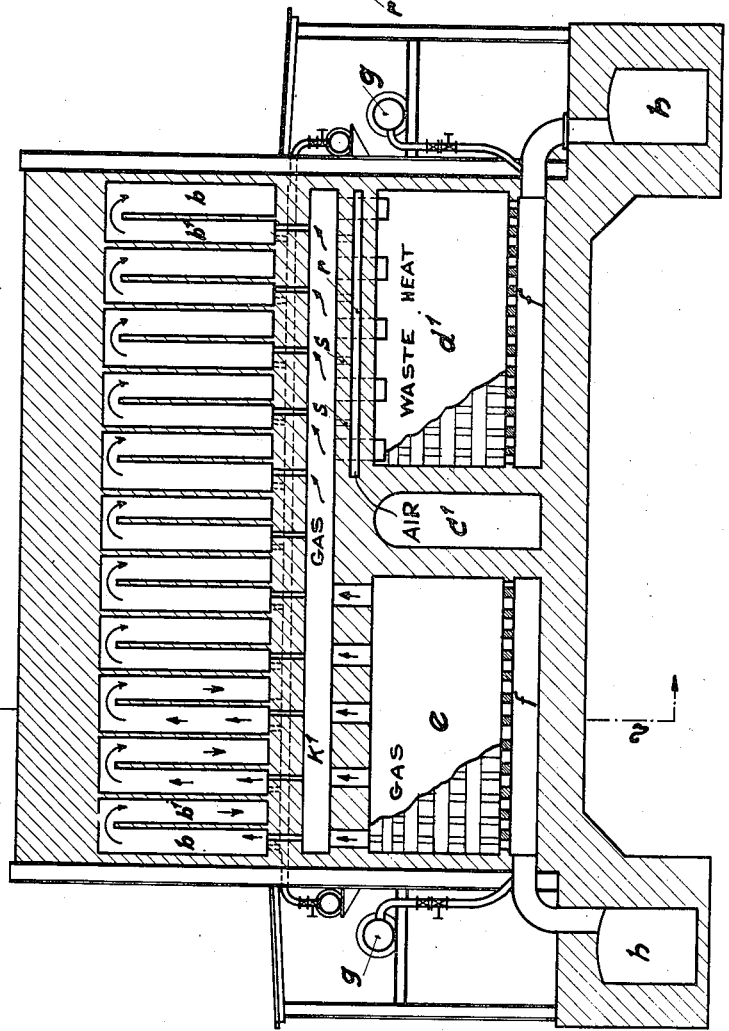
INVENTOR
Carl Otto
BY
W. F. Bissing
ATTORNEY April 2, 1935.  C. OTTO  1,996,483
COMBINED REGENERATIVE COKE OVEN
Filed Aug. 1, 1930   2 Sheets-Sheet 2
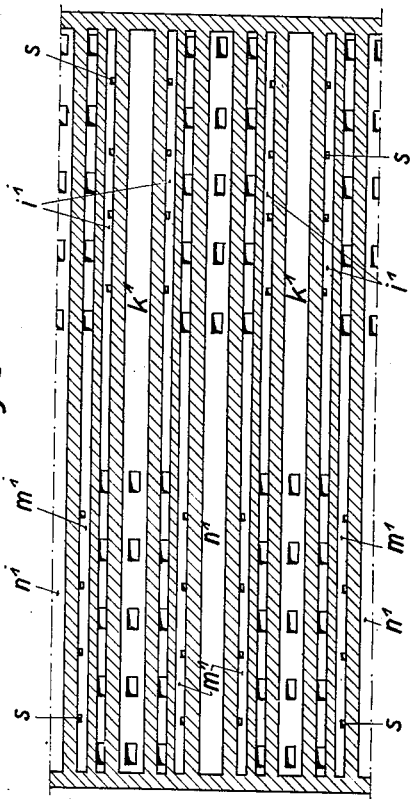
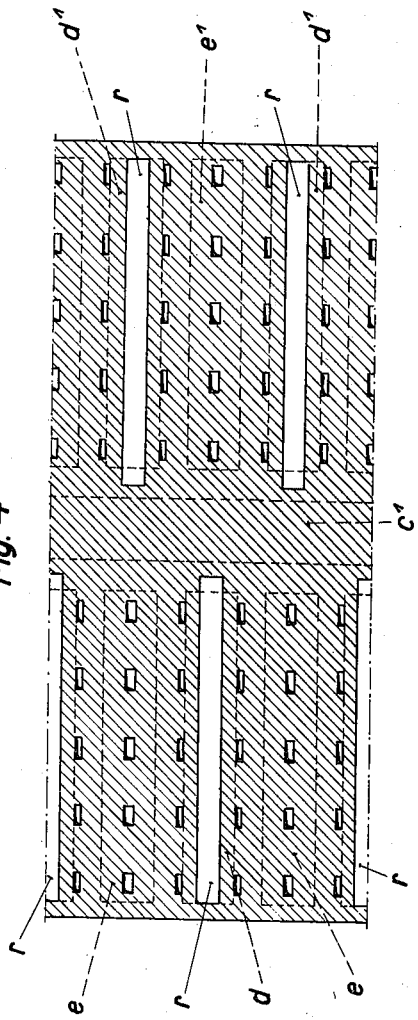
INVENTOR
Carl Otto
BY
Robert J. Pritchard
ATTORNEY Patented Apr. 2, 1935

1,996,483

UNITED STATES PATENT OFFICE 1,996,483

COMBINED REGENERATIVE COKE OVEN

Carl Otto, Essen-Ruhr, Germany

Application August 1, 1930, Serial No. 472,251
In Germany August 17, 1929

1 Claim. (Cl. 202—142)

The invention relates to combined regenerative coke ovens of the type described in my co-pending patent application Serial Number 239,046, filed December 10, 1927, and has for its object to improve coke ovens of this type.

In the coke oven forming the subject-matter of the aforesaid patent application the regenerators are disposed in the longitudinal direction of the horizontally elongated oven chambers and divided by a gas-tight partition into halves alternating with one another upon reversal of the draft. Each of these regenerator chambers is in communication either with all odd-numbered or all even-numbered heating flues of a heating wall by means of a distributing channel extending on the entire length of the latter. In this design each gas-conducting distributing channel, irrespective of whether the appurtenant gas regenerator is situated on the left-hand or right-hand half of the oven, is disposed, in the oven half remote from the gas regenerator, immediately above a waste heat regenerator. Now, when the brickwork between the distributing channel and the regenerator is comparatively thin in order to have the largest possible regenerator space, then the danger exists of gas passing at this place into the waste gas, if the brickwork be not absolutly gas-tight.

My invention therefore has for its object to eliminate this possibility of gas transition which object is obtained by an air-conducting channel being arranged within the brickwork separating the gas distributing channels from the regenerators situated therebelow and set to waste heat, which channel extends on the entire length of the waste heat regenerator and advantageously is in communication with the air distributing channels of the oven. Since the gas and the air in the distributing channels practically are under equal conditions of pressure because about the same quantity of air is required for the combustion of weak gas, and gas and air as far as possible flow at uniform speed, leakage between the gas channel and the air-conducting channel situated immediately therebelow is immaterial, because any notable exchange of air and gas cannot occur. Besides, the possibility of gas immediately penetrating in the waste gas regenerators is thus entirely excluded at any rate.

In order that my invention can be more readily understood, an embodiment of the same is illustrated by way of example in the accompanying drawings in which Figure 1 is a longitudinal vertical section through an oven designed in accordance with my invention, on the line 1—1 of Figure 2, while Figure 2 is a vertical cross section through the oven on the line 2—2 of Figure 1.

Figure 3 is a horizontal section passing through the horizontal gas and air distributing channels, and Figure 4 is a horizontal section passing through the air insulating channels.

The parts corresponding to those of my above co-pending application are denoted by the same reference letters.

As shown there is provided a series of alternate horizontally elongated oven chambers $a$ and parallel heating walls therefor, the latter comprising twin combustion flues $b$, $b'$.

The regenerators extend below and in the direction of the chambers and are divided into halves by the transverse partition $c$, having insulating space $c'$. Each alternate regenerator $d$ is adapted to alternately supply preheated air, while each intermediate regenerator $e$ is adapted to alternately supply preheated gas to each alternate flue of a heating wall, the waste gases passing off through the intermediate flues to the regenerators $d'$ and $e'$ (the latter not shown) located below the other half of the chamber. At suitable intervals the direction of flow through the regenerators is reversed.

Above each regenerator $d^1$ and $d$, respectively, communicating with the air distributing channel $m^1$ and $i^1$, respectively, is disposed the gas distributing channel $k^1$ and $n^1$, respectively. Now according to the invention a channel $r$ is provided between this gas distributing channel and the regenerator chamber which channel $r$ extends on the entire length of the regenerator and by a plurality of small passages $s$ communicates with the appurtenant air distributing channel $m^1$ or $i^1$ so that it is likewise traversed by air and separates the gas channel from the regenerator situated therebelow.

Instead of feeding air to the air channel $r$ from the air feeding channels of the oven it would of course be possible to connect it on its front ends to the atmosphere in which case this connection suitably is dispensed with in order to keep away cold outer air from the air feeding channels.

What I claim is—

A regenerative coke oven battery comprising a series of alternate horizontally elongated coking chambers and heating walls therefor arranged side by side in a row, each of said heating walls comprising a row of vertical combustion flues, two parallel rows of cross-regenerators arranged below the chambers on opposite sides of a partition extending longitudinally of the battery, each row of regenerators being adapted to operate alternately for inflow and outflow, a row of fuel gas distributing channels and a row of air distributing channels located between and extending parallel to the chambers and regenerators, ducts communicably connecting each channel with flues of a heating wall, a plurality of spaced ducts communicably connecting each of said channels with one of said regenerators, another air channel located between and extending parallel to each gas channel and the regenerator opposite that to which a fuel gas channel is connected, and means for supplying air from the first-named air distributing channels to the last-named air channels.

CARL OTTO.